US009246910B2

(12) United States Patent
Ekberg et al.

(10) Patent No.: US 9,246,910 B2
(45) Date of Patent: Jan. 26, 2016

(54) DETERMINATION OF APPARATUS CONFIGURATION AND PROGRAMMING DATA

(75) Inventors: Jan-Erik Ekberg, Vantaa (FI); Harald Kaaja, Järvenpää (FI)

(73) Assignee: Nokia Technologies Oy, Espoo (FI)

( * ) Notice: Subject to any disclaimer, the term of this patent is extended or adjusted under 35 U.S.C. 154(b) by 2 days.

(21) Appl. No.: 14/115,525

(22) PCT Filed: May 6, 2011

(86) PCT No.: PCT/FI2011/050418
§ 371 (c)(1),
(2), (4) Date: Jan. 28, 2014

(87) PCT Pub. No.: WO2012/152979
PCT Pub. Date: Nov. 15, 2012

(65) Prior Publication Data
US 2014/0351578 A1 Nov. 27, 2014

(51) Int. Cl.
*H04L 29/00* (2006.01)
*H04L 29/06* (2006.01)
(Continued)

(52) U.S. Cl.
CPC .......... *H04L 63/0823* (2013.01); *G06F 21/572* (2013.01); *H04W 12/04* (2013.01); *H04W 12/06* (2013.01); *H04L 63/101* (2013.01); *H04W 12/10* (2013.01)

(58) Field of Classification Search
CPC ....................................................... H04L 9/00
USPC ............................................................ 726/6
See application file for complete search history.

(56) References Cited

U.S. PATENT DOCUMENTS 6,980,660 B1* 12/2005 Hind et al. .................... 380/282
8,447,974 B2 5/2013 Boldyrev et al.
(Continued)

FOREIGN PATENT DOCUMENTS

CN 1351789 A 5/2002
EP 2110766 A1 10/2009

OTHER PUBLICATIONS

"Who Wins When the N8 Is Customised for the UK Users? Everyone!", All About Symbian, Retrieved on Oct. 20, 2014, Webpage available at: http://www.allaboutsymbian.com/features/item/12220_11.php#.
(Continued)

*Primary Examiner* — Brandon Hoffman
*Assistant Examiner* — Michael D Anderson
(74) *Attorney, Agent, or Firm* — Harrington & Smith

(57) ABSTRACT

A method including determining a public identifier for identifying a configuration of an apparatus, determining a common configuration certificate comprising a common configuration certificate identifier for verifying programming data, and determining a hardware certificate comprising the public identifier and the common configuration certificate identifier for associating a permitted combination of the apparatus configuration and the programming data. Furthermore, the method includes generating a dedicated package of the hardware certificates corresponding to the apparatus configurations allowed to be provided, encrypting the dedicated package of the hardware certificates using a public key, and storing the encrypted dedicated package of the hardware certificates with an identifier to a passive memory of the apparatus.

20 Claims, 6 Drawing Sheets

(51) Int. Cl.
    *G06F 21/57*     (2013.01)
    *H04W 12/06*     (2009.01)
    *H04W 12/04*     (2009.01)
    *H04W 12/10*     (2009.01)

(56) References Cited

U.S. PATENT DOCUMENTS

| | | |
|---|---|---|
| 8,490,151 B2 | 7/2013 | Boldyrev et al. |
| 8,547,232 B2 | 10/2013 | Boldyrev et al. |
| 8,686,860 B2 | 4/2014 | Boldyrev et al. |
| 2005/0005098 A1 | 1/2005 | Michaelis et al. |
| 2006/0061482 A1* | 3/2006 | Monney et al. .......... 340/825.52 |
| 2006/0200814 A1 | 9/2006 | Kontinen et al. |
| 2009/0327634 A1 | 12/2009 | Bovee |
| 2010/0132018 A1 | 5/2010 | Takala et al. |
| 2011/0187511 A1 | 8/2011 | Boldyrev et al. |
| 2011/0254687 A1 | 10/2011 | Arponen et al. |

OTHER PUBLICATIONS

Extended European Search Report received for corresponding European Patent Application No. 11865232.0, dated Sep. 22, 2014, 4 pages.

International Search Report received for corresponding Patent Cooperation Treaty Application No. PCT/FI2011/050418, dated Feb. 8, 2012, 4 pages.

* cited by examiner

DETERMINATION OF APPARATUS CONFIGURATION AND PROGRAMMING DATA

RELATED APPLICATION

This application was originally filed as PCT Application No. PCT/FI2011/050418 filed May 6, 2011.

TECHNICAL FIELD

The present invention generally relates to determination of an apparatus configuration and programming data. The invention relates particularly, though not exclusively, to generating the programming data and hardware certificates to a passive memory of the apparatus.

BACKGROUND ART

The manufacturing of modern apparatuses, e.g. mobile terminals etc., requires permanent and/or temporary programming of memory components with certain information. Such information may comprise firmware, operating system, application software or multimedia content, for example. The multimedia content may further comprise a content set, bundled content or content selected by the user, for example.

Software may be downloaded to an apparatus during manufacturing, e.g. flashing is performed by using a mechanism that requires preliminary flashing algorithms to be present on the apparatus, a physical connection and a connected power supply. The software download into products is conventionally performed in a programming station at the end of the manufacturing line after all components have been placed in the products. The software can also be re-programmed in later phases. There exist also solutions where software is programmed onto memory chips in separate programming stations before a component is placed on the printed wiring board (PWB).

The apparatus may be provisioned to a number of different variants, depending on the used firmware and configuration of the apparatus. In some cases a variant of the apparatus may only differ in the type of software that controls the apparatus.

In the case of electronic apparatuses, for example, the physical design of the apparatus may be the same for all variants of a product, but some of the basic control features may operate differently. Typically, each customer of the manufacturer, typically a service provider, a retailer, an operator or a cloud, may require a different variant type having different features.

Reworking of variants has become a commonplace practice in the manufacture of large-volume products, such as mobile apparatuses. Because of inaccurate sales forecasts, large numbers of one or more variants may be stored in a distribution center as increased inventory. Existing mobile apparatuses created of one variant type may then need to be converted quickly to a variant of another type for use by another service provider.

However, all these conventional procedures entail certain disadvantages. The programming step can only be performed at a pre-defined time in the manufacturing process, which also applies to any kind of testing/debugging. In addition, the conventional approach requires that direct, i.e. wired connections are made, requiring special equipment, slowing down the manufacturing cycle due to the time required for establishing the contact. Furthermore no adaptations can be performed after the finished product is packaged, e.g. updating the firmware or like.

Conventionally, the programming step for different variants can only be performed at a pre-defined time in the manufacturing process. In addition, the conventional approach requires that direct, i.e. wired connections are made, requiring special equipment, slowing down the manufacturing cycle due to the time required for establishing the contact. Furthermore no adaptations can be performed after the finished product is packaged, e.g. updating the firmware or like.

SUMMARY

According to a first example aspect of the invention there is provided a method comprising:
  determining a public identifier for identifying a configuration of an apparatus;
  determining a common configuration certificate comprising a common configuration certificate identifier for verifying programming data;
  determining a hardware certificate comprising the public identifier and the common configuration certificate identifier for associating a permitted combination of the apparatus configuration and the programming data;
  generating a dedicated package of the hardware certificates corresponding to the apparatus configurations allowed to be provided;
  encrypting the dedicated package of the hardware certificates using a public key; and
  storing the encrypted dedicated package of the hardware certificates with an identifier to a passive memory of the apparatus.

The method may further comprise defining the identifier for at least one of the following levels: a retailer, an operator and a cloud. The common configuration certificate may be signed with a common key. An application specific integrated circuit identifier may be defined for the apparatus and the hardware certificate comprising the application specific integrated circuit identifier may be determined. Furthermore, the hardware certificate may be signed with a common key.

The programming data may be selected from the group comprising:
  firmware;
  operating system software;
  configuration data;
  application software;
  multimedia content; and
  drivers.

The method may further comprise defining a static identifier for identifying a static configuration of the apparatus and defining a dynamic identifier for identifying a dynamic configuration of the apparatus. The dynamic configuration of the apparatus may be active for a fixed period of time. The encrypted dedicated package of the hardware certificates may be transmitted wirelessly with the identifier to the passive memory of the apparatus. The passive memory of the apparatus may comprise an embedded radio frequency (RF) memory tag being wirelessly accessible and powered from an external apparatus.

According to a second example aspect of the invention there is provided a method comprising:
  detecting an encrypted dedicated package of hardware certificates from a wireless memory of an apparatus based on an identifier;
  decrypting the encrypted dedicated package of the hardware certificates using a private key;
  selecting the hardware certificate from the decrypted dedicated package of the hardware certificates corresponding to a desired configuration of the apparatus;

writing programming data and the selected hardware certificate to the passive memory of the apparatus; and
deleting unselected hardware certificates from the passive memory of the apparatus.

The method may further comprise signing the programming data with a common key used for all permitted combinations of the apparatus configuration and the programming data. The programming data may be selected from the group comprising:
firmware;
operating system software;
configuration data;
application software;
multimedia content; and
drivers.

A static identifier may be detected for identifying a static configuration of the apparatus and a dynamic identifier may be detected for identifying a dynamic configuration of the apparatus. The dynamic configuration of the apparatus may be active for a fixed period of time.

The method may further comprise wirelessly transmitting the programming data and the selected hardware certificate to the passive memory of the apparatus. Furthermore, the passive memory of the apparatus may comprise an embedded radio frequency (RF) memory tag being wirelessly accessible and powered from an external apparatus.

According to a third example aspect of the invention there is provided a device comprising:
at least one processor; and
at least one memory including computer program code, the at least one memory and the computer program code being configured to, with the at least one processor, cause the device at least to perform:
determine, a public identifier for identifying a configuration of the apparatus;
determine, a common configuration certificate comprising a common configuration certificate identifier for verifying programming data;
determine, a hardware certificate comprising the public identifier and the common configuration certificate identifier for associating a permitted combination of the apparatus configuration and the programming data;
generate, a dedicated package of the hardware certificates corresponding to the apparatus configurations allowed to be provided;
encrypting the dedicated package of the hardware certificates using a public key; and
storing the encrypted dedicated package of the hardware certificates with an identifier to a passive memory of the apparatus.

According to a fourth example aspect of the invention there is provided a device comprising:
at least one processor; and
at least one memory including computer program code, the at least one memory and the computer program code being configured to, with the at least one processor, cause the device at least to perform:
detect an encrypted dedicated package of hardware certificates from a wireless memory of the apparatus based on an identifier;
decrypt the encrypted dedicated package of the hardware certificates using a private key;
select the hardware certificate from the decrypted dedicated package of the hardware certificates corresponding to a desired configuration of the apparatus;
writing programming data and the selected hardware certificate to the passive memory of the apparatus; and
deleting unselected hardware certificates from the passive memory of the apparatus.

According to a fifth example aspect of the invention there is provided an apparatus comprising:
at least one processor; and
at least one memory including computer program code, the at least one memory and the computer program code being configured to, with the at least one processor, cause the apparatus at least to:
receive, using the wireless short range communications interface, an encrypted dedicated package of hardware certificates with an identifier to the passive memory;
transmit, using the wireless short range communications interface, the encrypted dedicated package of the hardware certificates from the wireless memory based on the identifier;
receive, using the wireless short range communications interface, programming data and a selected hardware certificate to the passive memory; and
delete unselected hardware certificates from the passive memory based on received instructions.

According to a sixth example aspect of the invention there is provided a computer program embodied on a computer readable medium comprising computer executable program code which, when executed by at least one processor of an device, causes the device to perform:
determining a public identifier for identifying a configuration of an apparatus;
determining a common configuration certificate comprising a common configuration certificate identifier for verifying programming data;
determining a hardware certificate comprising the public identifier and the common configuration certificate identifier for associating a permitted combination of the apparatus configuration and the programming data;
generating a dedicated package of the hardware certificates corresponding to the apparatus configurations allowed to be provided;
encrypting the dedicated package of the hardware certificates using a public key; and
storing the encrypted dedicated package of the hardware certificates with an identifier to a passive memory of the apparatus.

According to a seventh example aspect of the invention there is provided a computer program embodied on a computer readable medium comprising computer executable program code which, when executed by at least one processor of an device, causes the device to perform:
detecting an encrypted dedicated package of hardware certificates from a wireless memory of an apparatus based on an identifier;
decrypting the encrypted dedicated package of the hardware certificates using a private key;
selecting the hardware certificate from the decrypted dedicated package of the hardware certificates corresponding to a desired configuration of the apparatus;
writing programming data and the selected hardware certificate to the passive memory of the apparatus; and
deleting unselected hardware certificates from the passive memory of the apparatus.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into an apparatus without other substantial functions than storing memory or it may be formed as part of an apparatus with other functions, including but not limited to a memory of a computer, a chip set, and a sub assembly of an electronic apparatus.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
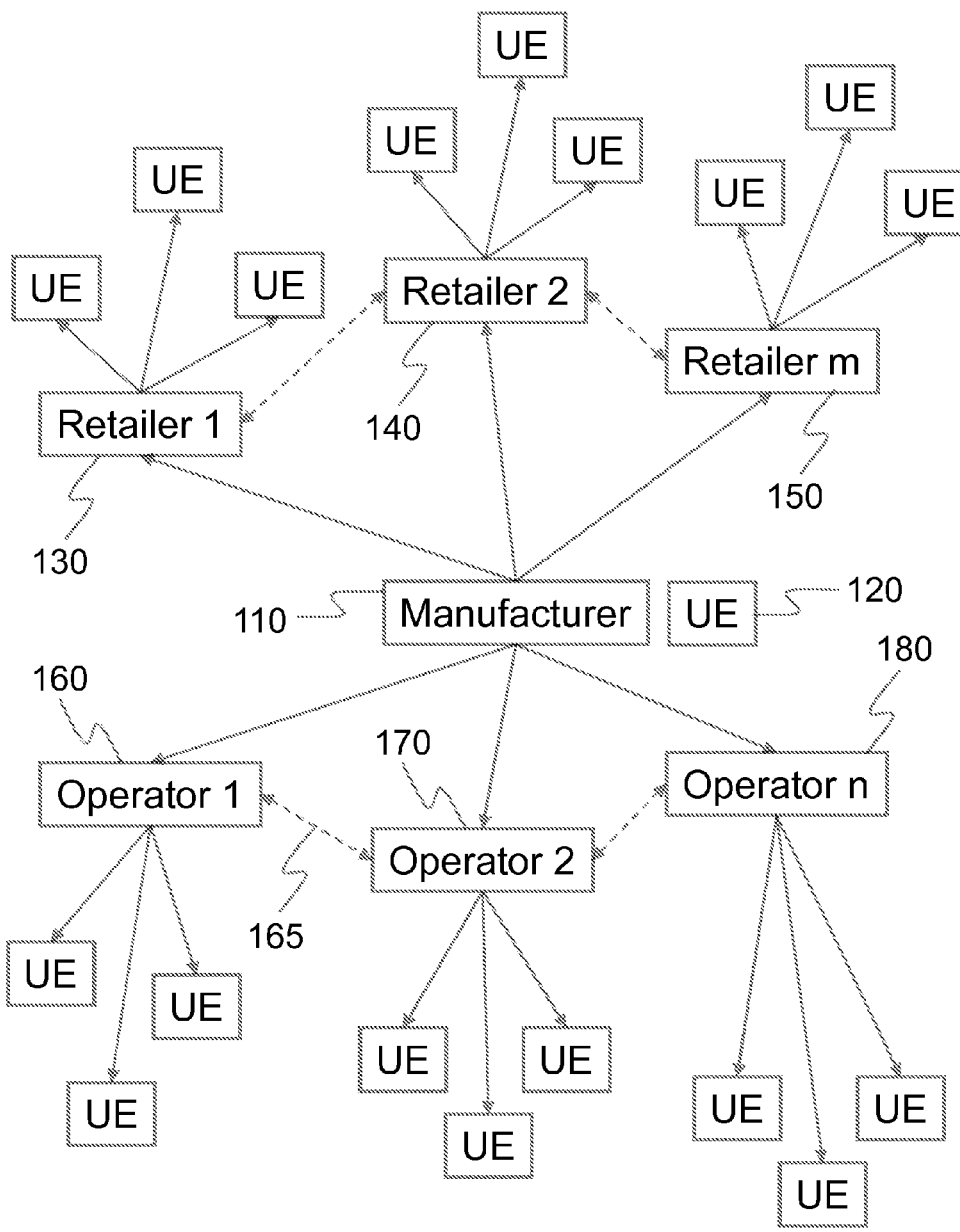
FIG. 1 shows some details of the system architecture.

FIG. 1 shows some details of the system architecture 100 in accordance with an example embodiment of the invention. A manufacturer 110 manufactures apparatuses, for example user equipment 120, for retailers 130-150 or operators 160-180, for example. User equipment 120 may comprise a mobile phone, a laptop, a personal digital assistant or an internet tablet, for example.

In accordance with an example embodiment of the invention, late personalization of the user equipment hardware into a variant is provided. Such variant may be targeted for a certain operator or a apparatus model. Ideally, the variant issuing may be done as late as possible, even as late as the warehouse of the operator 160-180, or in a sales office of the retailer 130-150. Such issuing may provide flexibility in manufacturing variants, but also may make it possible to provision newer software versions, even test software versions, to user equipment.

The user equipment 120 may be shipped uninitialized from the manufacturer 110 to the retailers 130-150 and operators 160-180. Warehouses of the retailers 130-150 and operators 160-180 may be located around the world. In the uninitialized state, the user equipment 120 can even be exchanged or resold. The user equipment 120 may thus be shipped forward between warehouses to balance variations in supply and demand. Only when the user equipment apparatus 120 is being taken into use, the firmware variant may be provisioned to the apparatus. The firmware variant image may even be written to the apparatus memory when the apparatus is powered down, potentially even directly through the sales package. Such firmware flashing may be utilized using a short-range wireless technology, for example radio frequency (RF) memory tag system. Firmware flashing without powering the apparatus may save in handling cost. Additionally such approach may save the manufacturer 110 from shipping labeling stations (i.e. a flashing device) to the retailers 130-150 and to the operators 160-180 that would enable firmware provisioning the way the user equipment 120 are flashed at the manufacturer 110 factories.

Also if the user equipment 120 is changed 165 from one operator 160 to the other operator 170, the operator variants may be securely reflashed to firmware. Such reflashing is possible if the user equipment is delivered from one operator domain to the other with appropriate retailer identification or operator identification, for example. Also, if the user equipment 120 is allowed to be retailer independent, there can be alternatively same mechanism used for cloud based image variants with cloud identification, for example.

As used herein, the phrase "software version" may refer to a version of an entire software application or merely a portion or component of a software application. The term "certificate" as used herein may refer to any block of signed data which may be signed using any known scheme, such as, for example a private/public key scheme.

Figure 2:
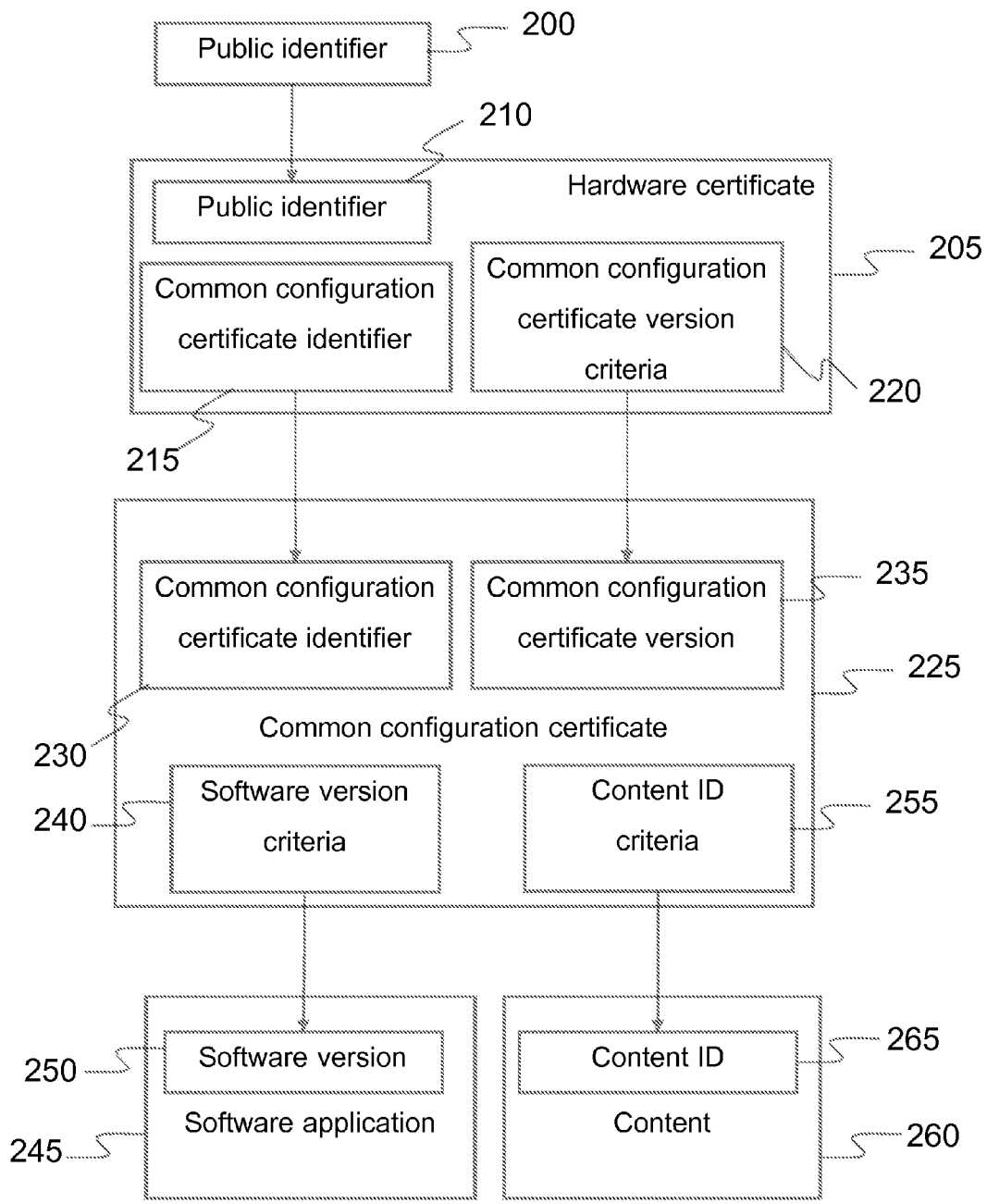
FIG. 2 shows a relationship diagram including security certificates according to various example embodiments of the present invention.

FIG. 2 shows a relationship diagram including security certificates according to various example embodiments of the present invention. In this regard, a hardware certificate 205 and a common configuration certificate 225 (generally referred to as security certificates) may be included in a scheme for managing software versions. In some example embodiments, the implementation of the hardware certificate 205 and the common configuration certificate 225 allow for updating or upgrading a software version. Further, in some example embodiments, the implementation of the hardware certificate 205 and the common configuration certificate 225 also prevents changing to an older or undesirable software version.

Example embodiments that employ the hardware certificate 205 and the common configuration certificate 225 provide for a secure tie between a unique public identifier of an apparatus and a particular software version to ensure that a proper software version is being utilized by the apparatus. In this regard, the hardware certificate 205 may be more closely associated with the apparatus and the common configuration certificate 225 may be more closely associated with a software version. A relationship between the hardware certificate 205 and the common configuration certificate 225, which may be securely authenticated, may facilitate updating of software on the apparatus while also providing security features.

In general, according to some example embodiments, the common configuration certificate 225 may be updated on an apparatus when an updated software version is introduced to the apparatus. Criteria of the hardware certificate 205 may be used to verify that the common configuration certificate 225 is proper and thereby verify that the software version is proper for the apparatus. Upon determining that a proper software version is installed on the apparatus, the software may be permitted to be executed by the apparatus. In this regard, a software version may be proper for an apparatus not only because the software is an updated version, but also because the software version is proper for the particular configuration of the apparatus (e.g. apparatus variant).

In this regard, the particular configuration of the apparatus may be identified via the unique public identifier of the apparatus. For example, the public identifier may be queried in a database that stores configuration information of apparatuses. However, implementation of the hardware certificate 205 and the common configuration certificate 225 may facilitate updating software in a manner that need not require that the public identifier of the apparatus be verified for each new software installation. Rather, an example authentication process between the hardware certificate 205 and the common configuration certificate 225, using more generic criteria than the unique public identifier of an apparatus, may provide for updating software versions without the complexity of involving the unique public identifier in each installation of a new software version on the apparatus. In this manner, manufacturing of apparatuses may be simplified where a new software version is being installed, because each installation need not be verified via the unique public identifier.

Referring again to FIG. 2, the public identifier 200 may be a hard coded or non-modifiable value that resides on a hardware device that is capable of executing a software application. The public identifier 200 may be stored on an integrated circuit such as a read-only memory device. In some example embodiments, the public identifier 200 may be signed and/or associated with a private key. Further, the public identifier 200 may be unique to the particular associated apparatus. As such, the public identifier 200 may be used to identify the particular configuration of the apparatus or apparatus variant.

The software application 245 may be any software application for execution by the apparatus associated with the public identifier 200. In some example embodiments, the software application 245 may be an operating system for the apparatus. The software application 245 may have and/or include a software version 250, which may be a number, a date, a size (e.g., size in kilobytes or the like), a combination thereof, or the like. The software version 250 may be signed and/or associated with a private key to facilitate secure authentication of software application 245. The hardware certificate 205 may be unique to a hardware apparatus (e.g., a computer, mobile terminal, or the like) and may be stored in the memory of the apparatus. The hardware certificate 205 may be associated with or include a public identifier 210, a common configuration certificate identifier 215, and common configuration certificate version criteria 220.

According to an example embodiment of the invention, the common configuration certificate 225 may be associated with a content 260. The content 260 may be any content to be used by the apparatus associated with the public identifier 200. In some example embodiments, the content 260 may be multimedia content for the apparatus. The content 260 may have and/or include a content identifier 265, which may be a number, a date, a size (e.g., size in kilobytes or the like), a combination thereof, or the like. The content identifier 265 may be signed and/or associated with a private key to facilitate secure authentication of the content 260.

The content identifier 265 may be criteria used to determine whether the content 260 is of a proper version for a common configuration certificate 225. The content identifier 265 may contribute an added level of security for ensuring that the common configuration certificate 225 is not used in conjunction with an inappropriate content identifier. As such, through the use of the content identifier 265, inappropriate content may be detected and execution of the content may be prevented. In some example embodiments, the content identifier 265 may include a threshold version value for a content 260. The content identifier 265 may be signed and/or associated with a private key to facilitate secure authentication.

The public identifier 210 of the hardware certificate 205 may match the public identifier 200 of an apparatus. The relationship between the public identifier 210 of the hardware certificate 205 and the public identifier 200 of the apparatus may be used to authenticate the hardware certificate 205. In some example embodiments, the public identifier 210 may be signed and/or associated with a private key to facilitate secure authentication of the hardware certificate 205. Failure to authenticate the hardware certificate via the public identifier 210 may prevent the execution of software on the apparatus.

The common configuration certificate identifier 215 may be a value that can be used in authenticating a common configuration certificate 225. Failure to authenticate a common configuration certificate 225 via the common configuration certificate identifier 215 may prevent the execution of software associated with that common configuration certificate. The common configuration certificate identifier 215 may be signed and/or associated with a private key to facilitate secure authentication of the common configuration certificate 225. The common configuration certificate version criteria 220 may be criteria used to determine whether a common configuration certificate 225 is of a proper version. In this regard, the common configuration certificate version criteria 220 may be configured such that the criteria can determine whether a common configuration certificate 225 is associated with software or content that is of a proper version and is configured for a proper apparatus variant. The proper version may be a latest software application version, bundled selected content set at the retailer, a limited version of an application/content or a trial version, for example. Through the use of the common configuration certificate version criteria 220, inappropriate common configuration certificates may be detected and execution of the software associated with an inappropriate common configuration certificate may be prevented. In some example embodiments, the common configuration certificate version criteria 220 may include a threshold version value for a common configuration certificate 225. In this regard, common configuration certificates with a version value higher than or equal to the threshold version value may meet at least one aspect of the common configuration certificate version criteria 220. The common configuration version criteria 220 may be signed and/or associated with a private key to facilitate secure authentication prior to application of the criteria. The common configuration certificate 225 may be associated with a software application 245. In some example embodiments, a common configuration certificate may be common amongst all installations of a particular software application. The common configuration certificate 225 may be stored in the memory of the apparatus. The common configuration certificate 225 may include a common configuration certificate identifier 230, a common configuration certificate version 235, content identification criteria 255 and software version criteria 240.

The common configuration certificate identifier 230 may be a value that can be used in authenticating a common configuration certificate 225 with a hardware certificate 205. In this regard, in some example embodiments, if the common configuration certificate identifier 215 of a hardware certificate matches the common configuration certificate identifier 230 of the common configuration certificate 225, then the common configuration certificate 225 may be authenticated. Failure to authenticate a common configuration certificate via the common configuration certificate identifier 230 may prevent the execution of software associated with the common configuration certificate. Similar to the common configuration certificate identifier 215, the common configuration certificate identifier 230 may be signed and/or associated with a private key to facilitate secure authentication of the common configuration certificate 225.

As described above, the common configuration certificate version 235 may be applied to the common configuration certificate version criteria 220 of a hardware certificate 205 to determine whether the common configuration certificate version 235 satisfies the common configuration certificate version criteria 220. Failure of the common configuration certificate version to satisfy the common configuration certificate version criteria 220 may result in preventing execution of software associated with a common configuration certificate. Similar to the common configuration certificate identifier criteria 220, the common configuration certificate version 235 may be signed and/or associated with a private key to facilitate secure authentication of the common configuration certificate version 235. The common configuration certificate 225 may belong to a certain common configuration certificate platform. Furthermore, utilizing the embodiments of the invention enables thus platform management functionalities.

The software version criteria 240 may be criteria used to determine whether a software version 250 is of a proper version for a common configuration certificate 225. The software version criteria 240 may contribute an added level of security for ensuring that the common configuration certificate 225 is not used in conjunction with an inappropriate software version. As such, through the use of the software version criteria 240, inappropriate software applications may be detected and execution of the software applications may be prevented. In some example embodiments, the software version criteria 240 may include a threshold version value for a software version 250. In this regard, software applications with a version value higher than or equal to the threshold version value may satisfy the software version criteria 240. The software version criteria 240 may be signed and/or associated with a private key to facilitate secure authentication prior to application of the criteria to a software version 250.

In accordance with an example embodiment of the invention, different variants may comprise application variants, service variants (bundled or separate), operator variants, firmware variants, user variants, operating system variants, apparatus level variants, apparatus set variants selected by user, infrastructure variants, and even cloud variants.

A variant firmware may be understood to be a software application 245 in FIG. 2, for example. The variant version 250 is replicated to the common configuration certificate 225. The match between the identities, or versions, in the common configuration certificate 225 and the firmware image 245 are checked at apparatus startup and they have to be the same. The fundamental reason for this check is that the user should not be allowed to change the variant after purchase. The common configuration certificate 225 may be signed with a common key across all apparatuses of a specific type. The common configuration certificate 225 may also have own common configuration certificate identifier 230.

Furthermore, the common configuration certificate identifier 230 may be replicated in the hardware certificate 205 that may uniquely bind the identities in the apparatus to the public identifier 210. The public identifier 210 may be, for example, a unique application specific integrated circuit identifier (ASIC id). The hardware certificate 205 may contain the common configuration certificate identifier 230 and the application specific integrated circuit identifier (ASIC id) 210, signed with a key common across the hardware platform. The matching of the identities may be checked when booting the apparatus.

In case of post-factory image provisioning needs to be performed and as long as the variant does not change from the originally intended one, reflashing of the variant image can be done. This means that image upgrades may be performed.

In general, deciding the variant at a very late stage before the apparatus ends up to the customer brings the issue introduced by the existence of the hardware certificate 205. Since the hardware certificate 205 may be bound to the application specific integrated circuit (ASIC) of the apparatus, and through the common configuration certificate 225 also may bound the variant type, such a certificate is needed for any possible variant type the apparatus could potentially end up with.

Possible solution might be to include hardware certificates 205, for all possible variants for this hardware, in the apparatus. This may result to a working solution, but enables the end user (or any entity that has handled the apparatus between the factory and the end-customer) to change the variant of the apparatus to any of the other variant available for that apparatus hardware. Another possible solution might be to include an active back-end protocol to manufacturer servers that generate the relevant hardware certificate 205 for the apparatus on-demand, when being presented with the public identifier 200 of the apparatus. This solution requires an open channel between the warehouses around the world and the manufacturer security backend. Also a trust in the flashing entity is required, since the manufacturer should to some degree trust the public identifier 200. The operator or the retailer may have an authorized certificate for flashing or an authorized flashing device, for example.

In accordance with an example embodiment of the invention, a secure system for provisioning the variant (and thereby the variant image) to the apparatus is provided. The provisioning may be done at a late stage, for example in operator premises. The system may be implemented with varying levels of assurance and with mechanism erasing all other encrypted sets of hardware certificates 205 from the apparatus memory after writing the desired variant image. The provisioning may be utilized at apparatus level, at infrastructure level or at cloud level, differentiating variant selection securely. The allowed hardware certificates 205 with retailer identifiers, operator identifiers and cloud identifiers may be stored to the apparatus memory in manufacturing phase and the unused hardware certificates may be removed when the apparatus is taken into use.

Figure 3:
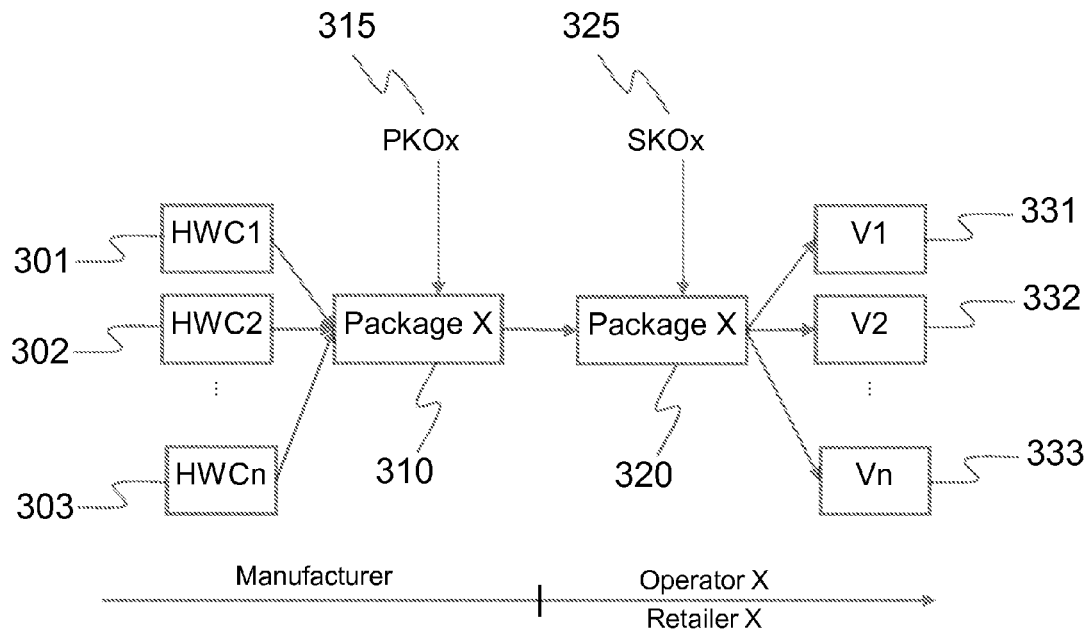
FIG. 3 shows a structure for a dedicated hardware certificate package creation mechanism in accordance with an example embodiment of the invention.

FIG. 3 shows a structure for a dedicated hardware certificate package creation apparatus in accordance with an example embodiment of the invention. In accordance with an example embodiment of the invention, the operators and retailers may be identified to the manufacturer's security servers. Such identification is accompanied with an operator/retailer public key (PKOx) 315 and possibly with an accompanying certificate outlining the key validity (not shown).

The operator public key 315 may be agreed on as part of a certification process, but one alternative is for the manufacturer to provide smart cards to operators with corresponding operator private key (SKOx) 325 on the card.

In accordance with an example embodiment of the invention, when manufacturing the hardware of the apparatus (so called labeling), the security servers in the manufacturer's factory may generate hardware certificates 301-303 for all known apparatus variants that are allowed to be run on the hardware. A dedicated package 310 of the hardware certificates 301-303 corresponding to variants for a given operator/ retailer allowed to provision, is created. Such package 310 may be encrypted with a public key (PKOx) 315 corresponding to the target operator or the target retailer. The encrypted package, with an operator/retailer identifier added to it, is written to a memory of the apparatus. The memory may be a passive memory that may be accessible without powering up the apparatus in the reseller warehouse. Such memory may comprise an embedded radio frequency (RF) memory tag, for example. The above described process may be repeated for all known m resellers (operators or retailers) of apparatuses with this hardware. Eventually the passive memory of the apparatus may comprise m different encrypted packages in the passive memory.

In accordance with an example embodiment of the invention, the apparatus may be shipped from the manufacturer's factory ending up to the reseller warehouse. The apparatus may even be re-distributed between the warehouses. When the apparatus finally is to be sold to an end customer, the reseller, equipped with a passive memory writer (e.g. a radio frequency (RF) memory tag writer), the secret key (SKOx) 325 and a variant image 331-333 is able to write a desired variant image 331-333 with the correct hardware certificate 301-303 to the passive memory of the variant apparatus. In an example embodiment, the passive memory writer may first read the encrypted package 320 (labeled with reseller identifier) and decrypt the package 320 with the secret key (SKOx) 325. From the decrypted contents, the hardware certificate 301-303 that corresponds to the variant image the reseller intends to write to the passive memory of the apparatus is selected. The image 331-333, the hardware certificate 301-303 and most likely the common configuration certificate may be written to the passive memory (e.g. an embedded radio frequency (RF) memory tag) of the apparatus. With such stored information, the apparatus may boot from the passive memory. Alternatively, at least part of the information may be stored to other memory of the apparatus for allowing booting the apparatus. Furthermore, the reseller may erase all other encrypted hardware certificate packages from the passive memory after writing the desired variant image 331-333. Thus other resellers may not relabel the same apparatus later.

If the secret key (SKOx) 325 is provided by the manufacturer on the smart card, secure audit logs and controls may be built into the smart card for enhanced security purposes. The smart card may return only one variant hardware certificate 301-303 for the given application specific integrated circuit identifier (ASIC id) or the public identifier. The common configuration certificate (CCC) may be bound to each variant image and may be assumed to be combined with the variant image. Thus, the common configuration certificate (CCC) may be treated as public information and either be pre-written to the apparatus or accompany the variant image.

In accordance with an example embodiment of the invention, the hardware certificates may enable static and dynamic variant parts. The static variant part may comprise all possible operator and retailer variants stored to the apparatus memory in manufacturing phase and selectively withdrawn at later stage when the variant is taken into use. Such choice may remain unchanged after taken into use.

The dynamic variant part may change within certain time frame based on static variant part selected. For example, a retailer may offer a test variant, being active for a time period when certain static variant part is selected. Such test variant may allow securely using certain software variant changes without statically taking into use. The selected static variant part may allow selecting a certain set of dynamic variants, defining capabilities of the dynamic variants and checking the hardware certificate package validity, for example.

Figure 4:
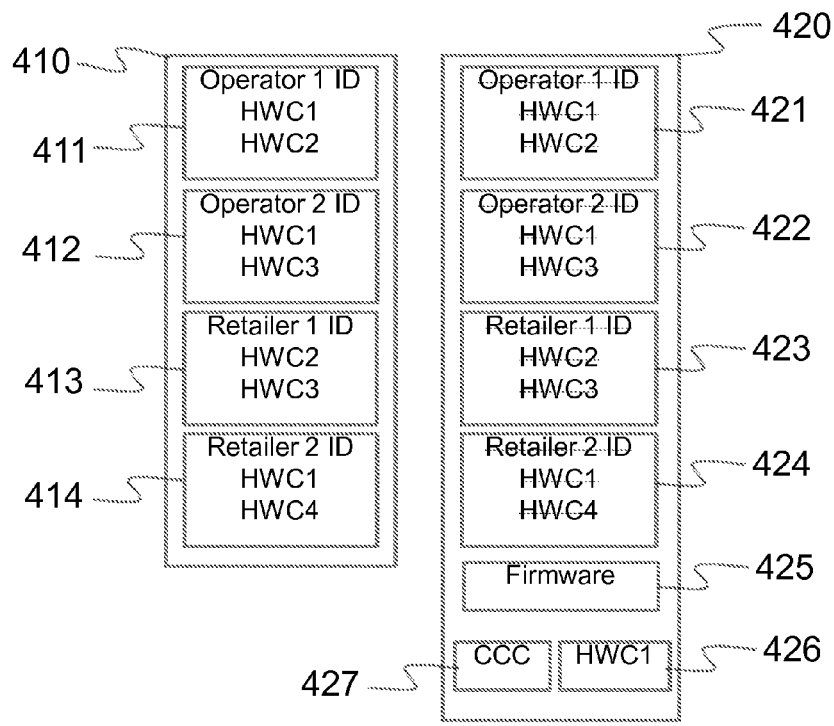
FIG. 4 shows some details of determining hardware certificates and programming data in accordance with an example embodiment of the invention.

FIG. 4 shows some details of determining hardware certificates and programming data in accordance with an example embodiment of the invention. A new apparatus is manufactured by a manufacturer with a securely stored set of correct variants in a passive memory 410 of the apparatus. Variants may be retailer based, operator based or cloud based and variants may be taken into use based on user selections.

The new apparatus may comprise several dedicated packages 411-414 of hardware certificates stored in the passive memory 410 of the apparatus, for example. Each package 411-414 may comprise an identifier for an operator or a retailer, for example. Based on such identifier, the operator or the retailer may recognize the correct package 411-414 to be used. Furthermore, the dedicated package 411-414 may comprise allowed hardware certificates for the reseller (e.g. operator/retailer) for different apparatus variants to be provisioned. As described earlier the dedicated package 411-414 may be encrypted using a public key PKOx.

The reseller (e.g. operator/retailer) receives the apparatus for selling to an end user. Depending on the user's selection a certain apparatus variant is decided. The reseller may access the passive memory 420 of the reseller apparatus. The passive memory 410, 420 may comprise for example an embedded radio frequency (RF) memory tag. For accessing such memory 410, 420, the reseller may use a radio frequency writer (RF writer). The encrypted package 421-424 labeled with correct reseller identifier may be read and decrypted with an appropriate secret key SKOx. Based on the desired apparatus variant, a programming data 425 is also selected comprising desired apparatus configuration and features for the end user. The programming data 425 is stored to the passive memory 420 of the apparatus. Typically, and in this embodiment, the programming data may be a firmware of the apparatus but any software may be implemented in similar mechanism. In addition to writing the firmware to the passive memory 420, also the correct hardware certificate (HWC1) 426 may be written decrypted to the passive memory 420 as well as the correct common configuration certificate (CCC) 427. For "retailer 2" case, for example, a desired firmware 425 of the "retailer 2" is stored to the passive memory 420 together with decrypted hardware certificate HWC1 (matching to the firmware 425 from the package 424) and the common configuration certificate (CCC) 427.

In accordance with an example embodiment of the invention, the unused encrypted packages 421-424 may be deleted after provisioning the desired variant. Furthermore, even the selected encrypted package 424 may be deleted after writing the firmware 425, the hardware certificate 426 and the common configuration certificate 427 to the passive memory 420 of the apparatus.

In case apparatus sales packages are not taken into use at a "retailer 2", then the packages may be allowed to taken into use at a "retailer 1", for example, without first delivering them back to the manufacturer. Both retailers are allowed to sell the apparatuses, so both retailer identifiers may be stored in the passive memory 410 of the new apparatus.

Figure 5:
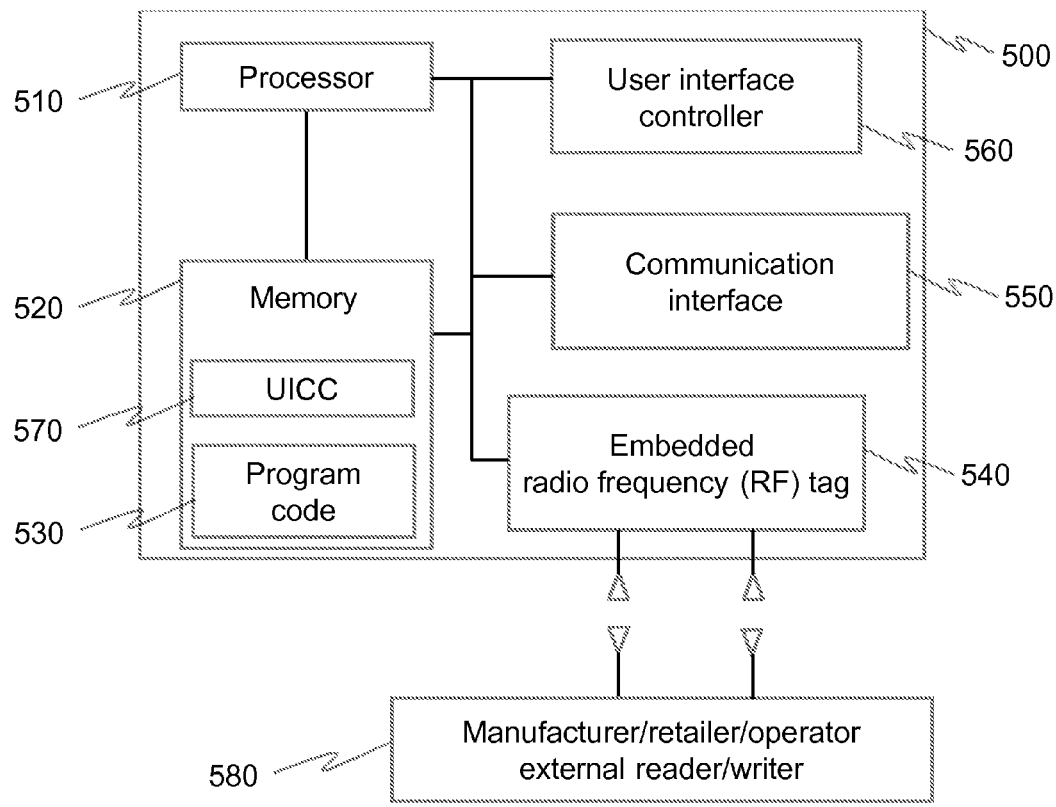
FIG. 5 presents an example block diagram of an apparatus and an external reader/writer device in which various embodiments of the invention may be applied.

FIG. 5 presents an example block diagram of an apparatus 500 and an external reader/writer device 580 in which various embodiments of the invention may be applied. The apparatus 500 may be a user equipment (UE), user device or apparatus, such as a mobile terminal or other communication device. The reader/writer device 580 may be a device used by an apparatus manufacturer, retailer or operator.

The general structure of the apparatus 500 comprises a communication interface module 550, a processor 510 coupled to the communication interface module 550, a passive memory 540 and a memory 520 coupled to the processor 510. The apparatus further comprises software 530 stored in the memory 520 and operable to be loaded into and executed in the processor 510. The software 530 may comprise one or more software modules and can be in the form of a computer program product. The apparatus 500 further comprises a user interface controller 560 coupled to the processor 510.

The communication interface module 550 implements at least part of the user data radio discussed in connection with various embodiments of the invention. The communication interface module 550 may be, e.g., a radio interface module, such as a WLAN, Bluetooth, GSM/GPRS, CDMA, WCDMA, or LTE (Long Term Evolution) radio module. The communication interface module 550 may be integrated into the apparatus 500 or into an adapter, card or the like that may be inserted into a suitable slot or port of the apparatus 500. The communication interface module 550 may support one radio interface technology or a plurality of technologies. FIG. 5 shows one communication interface module 550, but the apparatus 500 may comprise a plurality of communication interface modules 550.

The processor 510 may be, e.g., a central processing unit (CPU), a microprocessor, a digital signal processor (DSP), a graphics processing unit, or the like. FIG. 5 shows one processor 510, but the apparatus 500 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 500 may comprise a plurality of memories.

The memory 520 may be constructed as a part of the apparatus 500 or it may be inserted into a slot, port, or the like of the apparatus 500 by a user. The memory 520 may serve the sole purpose of storing data, or it may be constructed as a part of an apparatus serving other purposes, such as processing data.

A universal integrated circuit card (UICC) 570 may be included as a smart card used in the apparatus 500. The universal integrated circuit card (UICC) 570 ensures the integrity and security of certain personal data. The universal integrated circuit card (UICC) 570 may contain its unique serial number, internationally unique number of the mobile user (IMSI), security authentication and ciphering information, temporary information related to the local network, a list of the services the user has access to and passwords (PIN for usual use and PUK for unlocking). The universal integrated circuit card (UICC) 570 may further comprise several applications, making it possible for the same smart card to give access to different networks, and provide storage of a phone book and other applications. The system may utilize an embedded security module for the key storage and processing.

The user interface controller 560 may comprise circuitry for receiving input from a user of the apparatus 500, e.g., via a keyboard, graphical user interface shown on the display of the apparatus 500, speech recognition circuitry, or an accessory device, such as a headset, and for providing output to the user via, e.g., a graphical user interface or a loudspeaker.

The passive memory 540 may comprise the embedded radio frequency (RF) memory tag. The radio frequency (RF) memory tag system may provide high data rate communication at 10-100 Mbit/s between a reader/writer device and radio frequency (RF) tags containing a large memory (e.g., one or more Gigabits) operating over a very high data rate communication channel (e.g., impulse radio ultra wide band (UWB) at 7.9 GHz). The example embodiments disclosed herein may be designed on top of a radio frequency (RF) memory tag system. The radio frequency (RF) memory tag system may be based on near field communication. The example embodiments utilize memory resources of the radio frequency (RF) memory tag system as non-volatile memory blocks to provide execution-in-place capability for a reader/writer device 580, such as reseller device, to enhance the variant provisioning of the apparatus with the radio frequency (RF) memory tag system.

A skilled person appreciates that in addition to the elements shown in FIG. 5, the apparatus 500 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 500 may comprise a disposable or rechargeable battery (not shown) for powering the apparatus 500 when external power if external power supply is not available.

Figure 6:
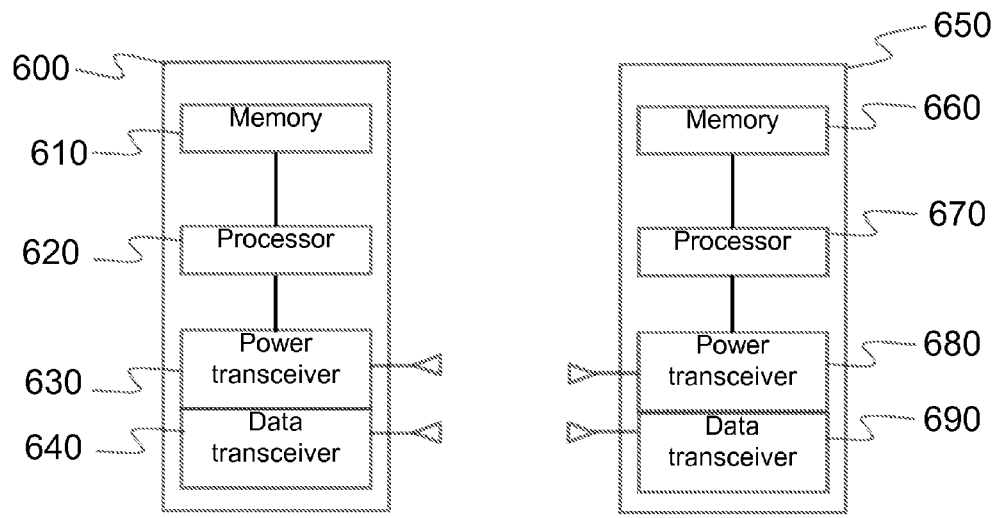
FIG. 6 illustrates an example embodiment for a reader/writer device and an embedded radio frequency (RF) memory tag of an apparatus.

FIG. 6 illustrates an example embodiment for a reader/writer device 600 and an embedded radio frequency (RF) memory tag 650 of an apparatus. The reader/writer device 600 may transmit radio frequency (RF) power and data to the memory module 650 and the memory module 650 may transmit data to the reader/writer device 600.

The memory module 650 may comprise a memory 660 for storing the provisioning related data, such as common configuration certificates, firmwares and dedicated encrypted packages containing hardware certificates, for example. The memory module 650 may further comprise a radio frequency power transceiver 680, a high bitrate RF data transceiver 690 and a processor 670. The radio frequency power transceiver 680 is capable for receiving power over an ultra-high frequency band or a near field communication (NFC), for example. The high bitrate RF data transceiver 690 may enable the communication over a short-range wireless link with the device 600. The processor 670 may be needed to control the overall functionalities and processing in the memory module 650. Due to the power transceiver 680, the memory module 650 may not need to be powered at all by the apparatus in which the memory module is located.

The device 600 may comprise a high bitrate RF data transceiver 690 that transmits the stored dedicated packages and reseller identifiers to the reader/writer device 600 for storage and processing in the device 600. The example reader/writer device 600 of FIG. 6 may further include a power transceiver 630 that transmits radio frequency (RF) power to the memory module 650 and a high bitrate radio frequency (RF) data transceiver 640 for communicating. Furthermore, a continuous wave clock signal may be transmitted to the memory module 650. The radio frequency power transceiver 630 is capable for transmitting power over an ultra-high frequency (UHF) band or a near field communication (NFC), for example. The memory 610 in the example reader/writer device 600 of FIG. 6 may include an operating system program. The operating system may read/write the data of the memory 660 transmitted/received from the memory module 650 with which the reader/writer device 600 is communicating.

According to an example embodiment of the invention, one of the devices 600, 650 may act as an embedded radio frequency (RF) memory tag without processor support as an active or a passive memory tag. The device 600, 650 may also act as a peer device with processor support.

The reader/writer device 600 may include a UHF RF module connected to a first RF antenna to transmit RF power and clock pulses on a 900 MHz carrier to the memory module 650 for powering and timing the circuits of the memory module 650. The reader/writer device 600 may include a high bitrate RF module 630 connected to a second RF antenna to exchange data over an impulse radio ultra wide band (UWB) link with the memory module 650. The reader/writer device 600 may include a processor 620 to control the components in the reader/writer device 600 and to execute programmed instructions to carry out the functions of the reader/writer device 600.

The memory module 650 may include a UHF RF module 680 connected to a first RF antenna to receive RF power and clock pulses on a 900 MHz carrier from the reader/writer device 600 for powering and timing the circuits of the memory module 650. The memory module 650 may include a high bitrate RF module connected to a second RF antenna to exchange data over the impulse radio ultra wide band (UWB) link with the reader/writer device 600. The memory module 650 may include a processor 670 to control the other components in the tag memory module 650 and to execute programmed instructions to carry out the functions of the memory module 650.

Figure 7:
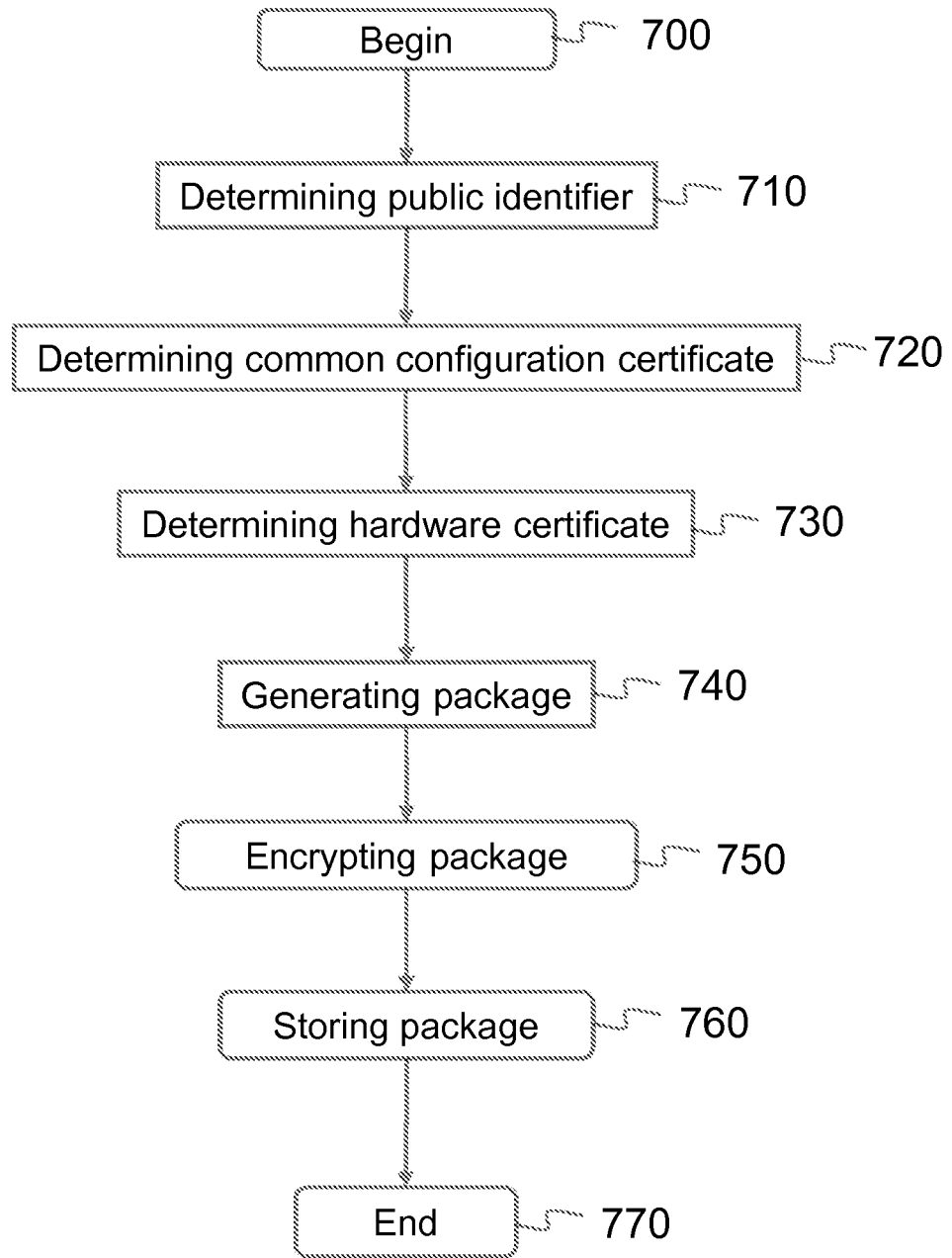
FIG. 7 shows a flow diagram showing operations in accordance with an example embodiment of the invention.

FIG. 7 shows a flow diagram showing operations in accordance with an example embodiment of the invention. In step 700, the method is started. In step 710, a public identifier for identifying a configuration of an apparatus is determined. In step 720 a common configuration certificate comprising a common configuration certificate identifier for verifying programming data is determined. A hardware certificate comprising the public identifier and the common configuration certificate identifier for associating a permitted combination of the apparatus configuration and the programming data is determined in step 730. A dedicated package of the hardware certificates corresponding to the apparatus configurations allowed to be provided is generated in step 740. In step 750, the dedicated package of the hardware certificates using a public key is encrypted and the encrypted dedicated package of the hardware certificates with an identifier is stored to a passive memory of the apparatus in step 760. The method ends in step 770.

Figure 8:
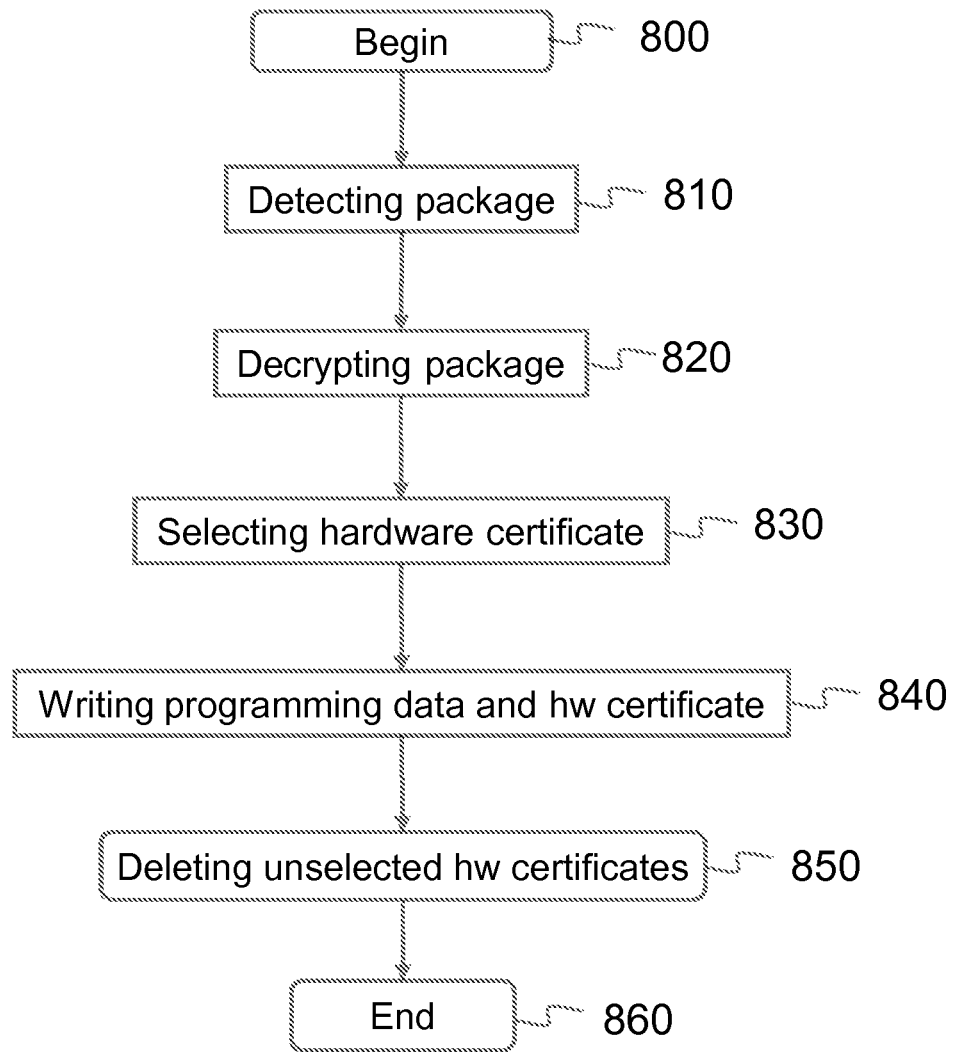
FIG. 8 shows another flow diagram showing operations in accordance with an example embodiment of the invention.

FIG. 8 shows another flow diagram showing operations in accordance with an example embodiment of the invention. In step 800, the method is started. In step 810, an encrypted dedicated package of hardware certificates from a wireless memory of an apparatus is detected based on an identifier. In step 820, the encrypted dedicated package of the hardware certificates is decrypted using a private key. The hardware certificate from the decrypted dedicated package of the hardware certificates corresponding to a desired configuration of the apparatus is selected in step 830. Programming data and the selected hardware certificate is written to the passive memory of the apparatus in step 840 and unselected hardware certificates are deleted from the passive memory of the apparatus in step 850. The method ends in step 860.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A device comprising:
a wireless short range communications interface configured to communicate with an apparatus;
at least one processor; and
at least one memory including computer program code, the at least one memory and the computer program code being configured to, with the at least one processor, cause the device at least to:
determine a public identifier for identifying a configuration of the apparatus;
determine a common configuration certificate associated with a particular version of programming data comprising a common configuration certificate identifier for verifying programming data;
determine a hardware certificate comprising the public identifier and the common configuration certificate identifier for associating a permitted combination of the apparatus configuration and the programming data;
generate a dedicated package of the hardware certificates corresponding to the apparatus configurations allowed to be provided;
encrypt the dedicated package of the hardware certificates using a public key; and
store the encrypted dedicated package of the hardware certificates with an identifier to a passive memory of the apparatus.

2. The device of claim 1, wherein the device is further caused to:
define the identifier for at least one of the following levels: a retailer, an operator and a cloud.

3. The device of claim 1, wherein the device is further caused to:
sign the common configuration certificate with a common key.

4. The device of claim 1, wherein the device is further caused to:
define an application specific integrated circuit identifier for the apparatus; and
determine the hardware certificate comprising the application specific integrated circuit identifier.

5. The device of claim 1, wherein the device is further caused to:
sign the hardware certificate with a common key.

6. The device of claim 1, wherein the programming data are selected from the group comprising:
firmware;
operating system software;
configuration data;
application software;
multimedia content; and
drivers.

7. The device of claim 1, wherein the device is further caused to:
define a static identifier for identifying a static configuration of the apparatus.

8. The device of claim 1, wherein the device is further caused to:
define a dynamic identifier for identifying a dynamic configuration of the apparatus.

9. The device of claim 8, wherein the dynamic configuration of the apparatus is active for a fixed period of time.

10. The device of claim 1, wherein the device is further caused to:
wirelessly transmit the encrypted dedicated package of the hardware certificates with the identifier to the passive memory of the apparatus.

11. The device of claim 1, wherein the passive memory of the apparatus comprises an embedded radio frequency (RF) memory tag being wirelessly accessible and powered from an external apparatus.

12. A device comprising:
a wireless short range communications interface configured to communicate with an apparatus;
at least one processor; and
at least one memory including computer program code, the at least one memory and the computer program code being configured to, with the at least one processor, cause the device at least to:
detect an encrypted dedicated package of hardware certificates from a wireless memory of the apparatus based on an identifier;
decrypt the encrypted dedicated package of the hardware certificates using a private key;
select the hardware certificate from the decrypted dedicated package of the hardware certificates corresponding to a desired configuration of the apparatus;
writing programming data, associated by a permitted combination of the apparatus configuration and the programming data, and the selected hardware certificate to the passive memory of the apparatus, wherein the association is based upon a verification of the programming data by the identifier being associated with a particular version of the programming data; and
deleting unselected hardware certificates from the passive memory of the apparatus.

13. The device of claim 12, wherein the device is further caused to:
sign the programming data with a common key used for all permitted combinations of the apparatus configuration and the programming data.

14. The device of claim 12, wherein the programming data are selected from the group comprising:
firmware;
operating system software;
configuration data;
application software;
multimedia content; and
drivers.

15. The device of claim 12, wherein the device is further caused to:
detect a static identifier for identifying a static configuration of the apparatus.

16. The device of claim 12, wherein the device is further caused to:
detect a dynamic identifier for identifying a dynamic configuration of the apparatus.

17. The device of claim 16, wherein the dynamic configuration of the apparatus is active for a fixed period of time.

18. The device of claim 12, wherein the device is further caused to:
wirelessly transmit the programming data and the selected hardware certificate to the passive memory of the apparatus.

19. The device of claim 12, wherein the passive memory of the apparatus comprises an embedded radio frequency (RF) memory tag being wirelessly accessible and powered from an external apparatus.

20. A method comprising:
determining a public identifier for identifying a configuration of an apparatus;
determining a common configuration certificate associated with a particular version of programming data comprising a common configuration certificate identifier for verifying programming data;
determining a hardware certificate comprising the public identifier and the common configuration certificate identifier for associating a permitted combination of the apparatus configuration and the programming data;
generating a dedicated package of the hardware certificates corresponding to the apparatus configurations allowed to be provided;
encrypting the dedicated package of the hardware certificates using a public key; and
storing the encrypted dedicated package of the hardware certificates with an identifier to a passive memory of the apparatus.

* * * * *